United States Patent [19]
Williams

[11] 3,955,424
[45] May 11, 1976

[54] INTEGRAL MECHANICAL GOVERNOR
[75] Inventor: John G. Williams, Warren, N.J.
[73] Assignee: Turbodyne Corporation, Wellsville, N.Y.
[22] Filed: Mar. 10, 1975
[21] Appl. No.: 556,654

[52] U.S. Cl. .................................... 73/535; 73/550
[51] Int. Cl.² .................. G01P 3/16; G01P 15/02
[58] Field of Search .................. 415/25, 30, 36, 43, 415/39, 40, 41, 42; 73/535, 550; 184/6.22

[56] References Cited
UNITED STATES PATENTS

| | | | |
|---|---|---|---|
| 2,001,857 | 5/1935 | Watson | 184/6.22 |
| 2,022,284 | 11/1935 | Hawxhurst | 415/36 |
| 2,392,265 | 11/1946 | Ricardo | 73/550 |
| 2,491,109 | 12/1949 | Horton | 73/550 |
| 2,675,220 | 4/1954 | Feilden | 415/43 |
| 2,926,900 | 3/1960 | Gaubatz | 73/493 |
| 3,028,848 | 4/1962 | Catterson | 73/494 |

Primary Examiner—Carlton R. Croyle
Assistant Examiner—L. J. Casoregola
Attorney, Agent, or Firm—Daniel H. Bobis

[57] ABSTRACT

An integral mechanical governor for controlling the speed of prime movers, such as steam turbines is disclosed as a separate structure that can be mounted on and coupled to the shaft of the associated prime mover. The device includes a housing having at least one end opening and closure means for the open end of the housing, the housing and closure defining a governor assembly chamber and a sump for lubricating fluid. The end wall remote from the open end has an inboard bearing means for rotatably mounting a driven shaft disposed to extend from the governor assembly chamber through the bearing to the exterior of the housing to permit said driven shaft to be coupled to the shaft of the prime mover when the integral mechanical governor is mounted thereon in assembled position. A substantially conventional governor assembly is mounted in the governor assembly chamber of the housing and a self contained lubrication system is provided in the housing which includes an oil ring rotatably disposed on the governor assembly and sized to pass through the lubricating fluid in the sump so as to throw and splash the lubricating fluid towards the upper end of the governor assembly chamber and a portion is conducted by a transfer member and ports to lubricate the inboard and outboard bearings of the integral mechanical governor.

A filter is provided on the transfer member to filter the lubricant delivered to the bearings.

14 Claims, 9 Drawing Figures

INTEGRAL MECHANICAL GOVERNOR

BACKGROUND OF THE INVENTION

This invention relates generally to mechanical devices for controlling the speed of prime movers and more particularly to an integral mechanical governor which is adapted for application to a variety of primer movers operating at different speeds and service conditions.

The use of a mechanical governor to control the speed of prime movers such as steam turbines is well known in the prior art. However, these prior art mechanical governors generally have been constructed as an element or part of the prime mover and in most instances are operatively associated and driven by the drive shaft for the prime mover.

Additionally, the mechanical governor when so constructed is normally dependent for lubrication on the lubrication system for the prime mover.

The present invention seeks to provide an integral mechanical governor which is built and assembled as a separate structure or assembly with means thereon to affix it at a suitable location on the prime mover so it can be coupled to the drive shaft of the prime mover. The integral mechanical governor in accordance with the present invention will include a self contained lubrication system preferably independent from that of the prime mover when the mechanical governor is in assembled position for operation.

The device in accordance with the present invention is desirable because it can be built and assembled in large quantities to effect cost savings and merely by changing the weight members on the governor assembly the integral mechanical governor can be applied to turbines, other prime movers, and other rotary devices operating at different speeds and under a variety of service conditions.

SUMMARY OF THE INVENTION

Thus the present invention covers an integral mechanical governor comprising, a housing forming a governor assembly chamber and a lubricant sump, with at least one open end and at least one closure member detachably connected to the housing at the open end thereof, means on the housing for connecting the mechanical governor into assembled position, an inboard bearing means in one end of the housing, a driven shaft rotatably mounted in said inboard bearing means and extending in the axial line of the inboard bearing means from the governor assembly chamber in said housing to the exterior of the housing, an outboard bearing means connected in the end of said housing means remote from the inboard bearing end, and a governor assembly in said governor assembly chamber in alignment with said inboard bearing and slidably disposed for movement in said outboard bearing, said governor assembly including, weight holder means fixedly connected and rotatable with said driven shaft on the end thereof in the governor assembly chamber, and lubrication means formed in said housing including, an oil ring rotatably mounted on the governor assembly and so disposed relative said lubricant sump that on rotation of said oil ring, lubricant will be thrown by the oil ring to the upper end of said governor assembly chamber for lubricating the governor assembly, and means for distributing said lubricant to said inboard and outboard bearings.

Additionally, removable filter means on said means for distributing lubricant to said inboard and outboard bearings.

Accordingly, it is the object of the present invention to provide an improved integral mechanical governor for controlling the speed of prime movers.

It is another object of the present invention to provide an integral mechanical governor which has an independent lubrication system thereon.

Other objects and advantages of the invention including the basic design and the nature of the improvements thereon will appear from the following description taken in conjunction with the accompanying drawings in which.

Figure 1:
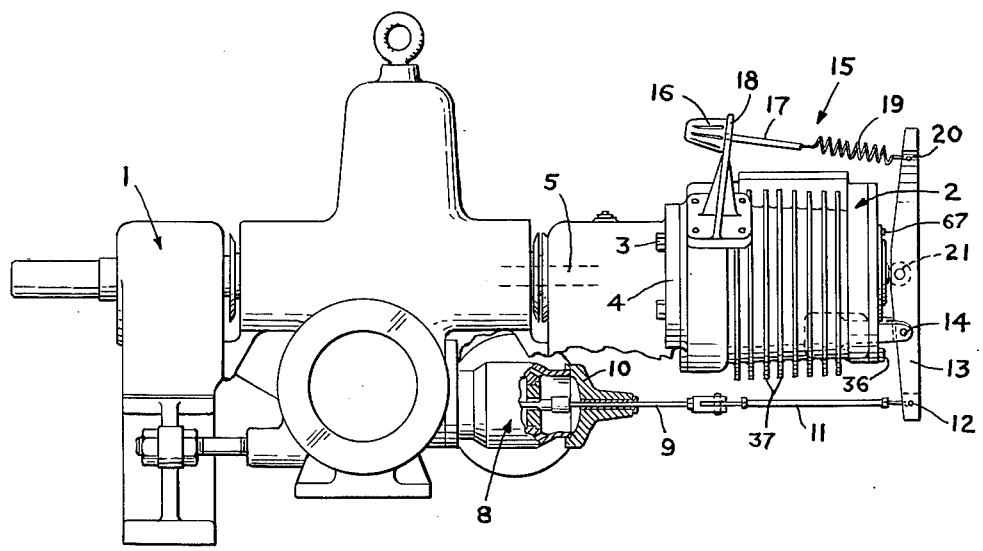
FIG. 1 is a side view partly broken away of a steam turbine on which an integral mechanical governor in accordance with the present invention is installed.
Figure 2:
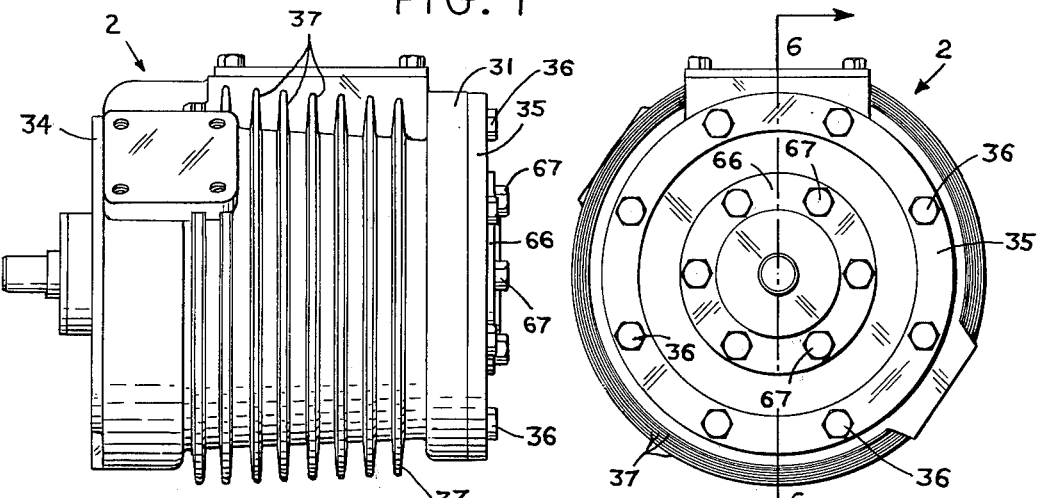
FIG. 2 is a right side view of the integral mechanical governor shown in FIG. 1.
Figure 3:
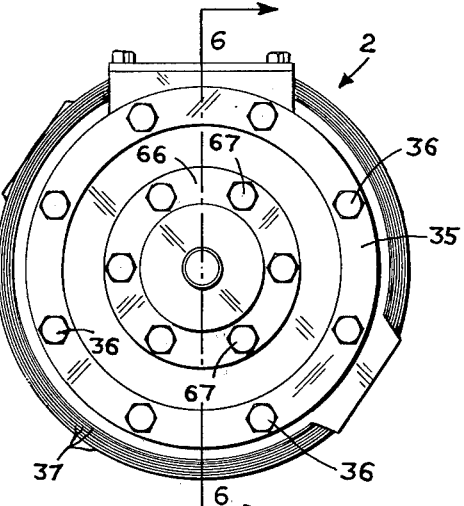
FIG. 3 is an outboard bearing end view of the mechanical governor shown in FIG. 1.
Figure 4:
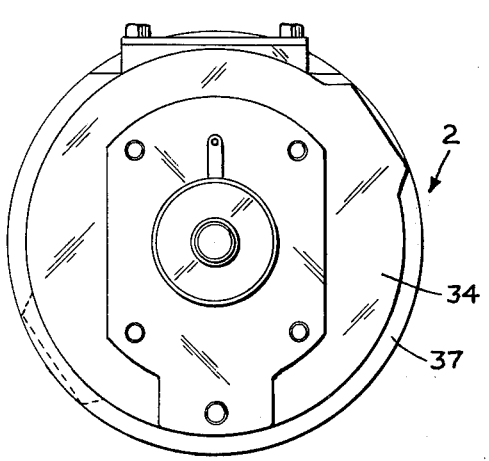
FIG. 4 is an inboard bearing end view of the mechanical governor shown in FIG. 1
Figure 5:
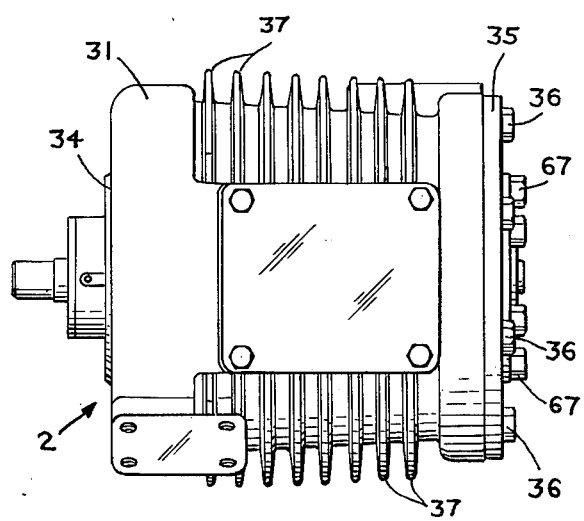
FIG. 5 is a top plan view of the mechanical governor shown in FIG. 1.
Figure 6:
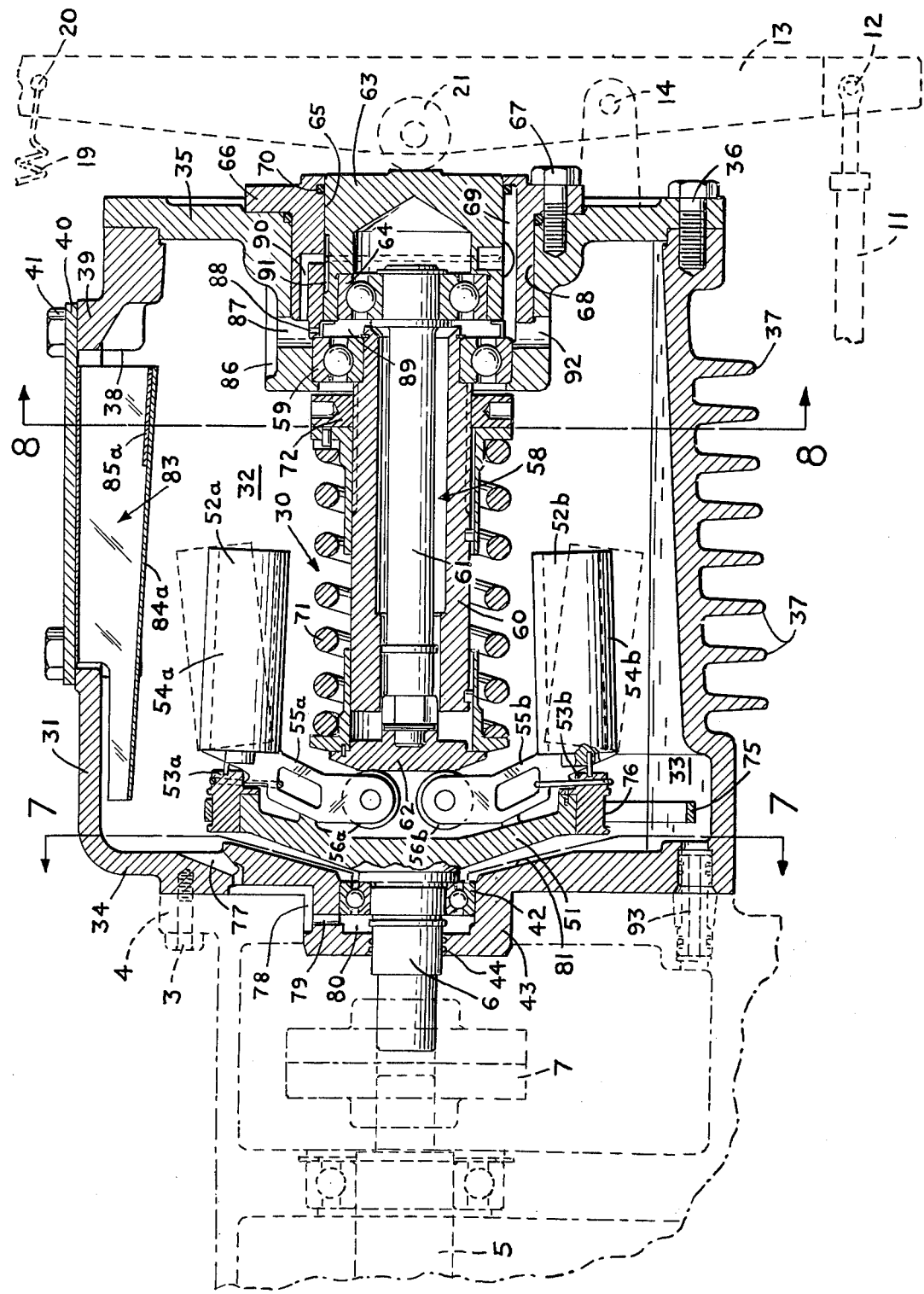
FIG. 6 is a vertical section taken on line 6—6 of FIG. 3 with the associated lever arms and connecting members in side elevation.
Figure 7:
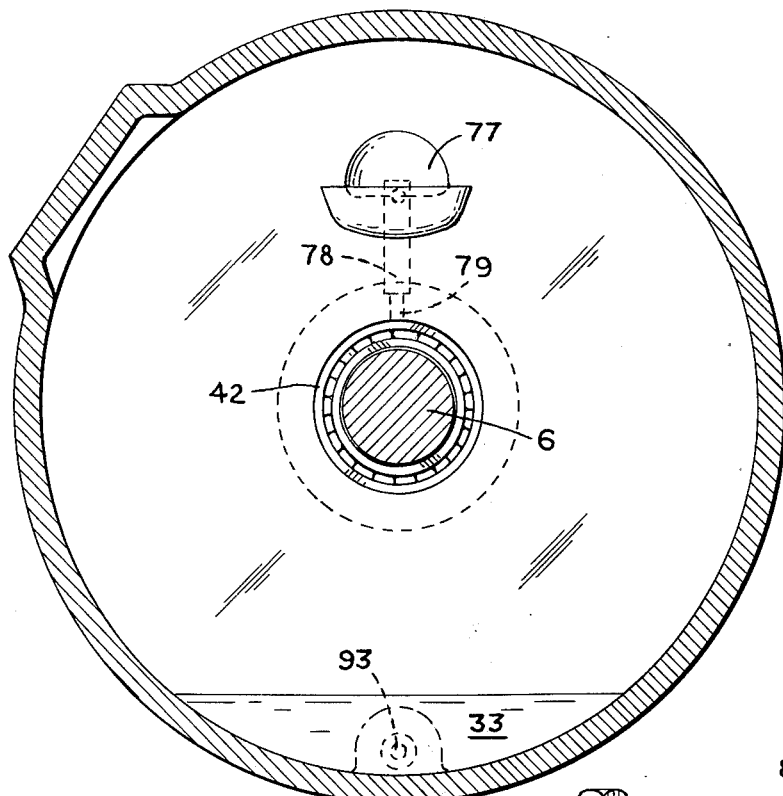
FIG. 7 is a cross section taken on line 7—7 of FIG. 6, showing the inlet end of the passage means for delivering lubricant to the inboard bearing means.

Referring to the drawings FIG. 1 shows a steam turbine generally designated 1 of the type purchaseable on the open market to which an integral mechanical governor generally designated 2 in accordance with the present invention is removably connected as by the threaded means 3 on the flange 4 thereof so that the integral mechanical governor is in the axial line of drive shaft 5 of the steam turbine 1 as is more clearly shown in FIG. 6.

The shaft 5 of the steam turbine 1 will be connected to the driven shaft 6 of the mechanical governor by any suitable type of flexible coupling 7 so that the driven shaft 6 will be rotated simultaneously with and at the same speed as the shaft 5 of the steam turbine.

Steam turbine 1 has a conventional steam inlet control valve 8 for delivering steam thereto to drive the rotor, not shown, which rotates the drive shaft 5 of the steam turbine, as is well known and understood by those skilled in this art.

The steam inlet valve 8 includes, a valve stem 9 which extends to the exterior of the steam inlet valve housing 10. Valve stem 9 is connected to one end of an adjustable valve stem linkage 11, the remote end of which is in turn connected as at 12 to one end of a governor lever 13 pivotably mounted as at 14 to the outboard or outer end of the mechanical governor 2 so that the governor lever can be actuated by the mechanical governor 2 as is more fully described hereinafter.

The governor lever 13 is held in engagement with the mechanical governor 2 by means of a speed change adjustment means generally designated 15 which includes a speed change adjusting knob 16 and rod 17 mounted in a bracket 18 on the governor 2 and a resilient member 19 which is connected between the rod 17 and the point 20 on the governor lever 13 on the side of the pivot 14 remote from the point where the adjustable valve stem linkage 11 is connected to the governor lever 13 by adjusting the speed change knob 16 more or less tension can be placed on the governor lever 13.

The governor lever 13 has a roller 21 which coacts with the governor assembly generally designated 30 which will be more fully described below. Pin roller 21 is disposed medially between the fulcrum pivot 14 of the governor lever 13 and the point 20 where the resilient member 19 is connected and in assembled position is brought into abutment with the portion of the governor assembly 30 which will be moved responsive to variations in the speed at which the turbine or other prime mover is operating.

The steam inlet valve 8 is normally fully open, and the entire linkage above described acts to transfer the motion of the governor assembly 30 resulting from speed changes to the means for moving the valve toward the clsoed position as turbine speed increases. Operation of the steam inlet valve can thus be controlled, regulated and modulated by the action of the mechanical governor 2 so as to maintain the speed of the turbine between predetermined minimum and maximum limits.

Turbine speed will, of course, be controlled through a conventional speed adjustment control responsive to the varying requirements of a given condition such as the discharge pressure of a centrifugal pump, the temperature of the cooling medium in a compressor refrigeration system, etc., and the mechanical governor will act to prevent the turbine from exceeding the predetermined maximum limit or range of the operation set by the speed adjustment means.

The arrangement above described in which the speed of the steam turbine or other prime mover is controlled by the mechanical governor through suitable linkage is an old and well known expedient and accordingly is not more fully described herein because the present invention is directed to an improved integral and independent mechanical governor for use in the same combination to produce the same result as has been heretofore achieved by the prior art devices.

As above indicated the prior art devices were generally constructed as an integral part of the turbine or rotary device and connected on the shaft structure of the prime mover. Normally such prior art mechanical governors were dependent for lubrication on oil supplied from the lubrication system of the associated turbine or other prime mover or rotary device to be controlled.

In the mechanical governor 2 of the present invention, the mechanical governor is a separate structure in which the driven shaft and associated elements of the governor assembly are supported by their own bearings and the mechanical governor includes its own complete lubrication system which is preferably independent of that of the associated prime mover to which the mechanical governor is connected.

This integral structure now to be described can be built and assembled in fairly large quantities to effect substantial cost savings and is adjustable at the factory or in the field by merely changing the weights so that the integral mechanical governor in accordance with the present invention can be applied to a variety of different speeds, services and other operating conditions of the prime mover and can be replaced and repaired easily.

INTEGRAL MECHANICAL GOVERNOR

Thus, referring to FIGS. 2 to 9 of the drawings, the integral mechanical governor 2 is shown to include a generally cylindrical housing 31 which defines a governor assembly chamber 32 and a lubricant sump 33 therein.

The housing as shown in this preferred form of the invention is generally cup shaped having a closed end wall 34 at the inboard end thereof and at the outboard end remote therefrom which is open a closure means 35 is connected to close the open end as by threaded members 36.

The exterior of the housing is provided with a plurality of radially extending cooling fins as at 37 which serve to remove heat from the wall of the mechanical governor 2 and thus act to cool the lubricant fluid in the sump 33.

The housing 31 is provided with an access opening 38 and a boss 39 about the access opening provides means for connecting an access opening cover 40 thereto as by threaded means 41.

In the end wall 34 inboard bearing means 42 is provided to rotatably mount the driven shaft 6 which as shown in FIG. 6 extends from the interior of the governor assembly chamber 32 to the exterior of the housing 31 through an opening in the annular boss 43 provided with seals 44 thereon to prevent leakage of the lubricant from the mechanical governor 2 into the turbine or other prime mover when the mechanical governor is in operation.

The end of the driven shaft 6 in the governor assembly chamber is connected to a governor weight holder 51 which is fixedly connected and rotatable with the driven shaft 6.

Substantially L-shaped weight members 52a and 52b are pivotally connected to the weight holder 51 at the points 53a and 53b respectively where the respective legs of the L-shaped weight members intersect. In assembled position the weight members are connected on the weight holder spaced 180° from each other and the weighted legs 54a and 54b respectively on the weight members 52a and 52b will in non-operating position lie substantially parallel to the longitudinal line of the mechanical governor 2 and the respective actuating cam lever legs 55a and 55b will lie approximately normal to the said longitudinal line of the mechanical governor 2.

At the end of each respective actuating cam lever leg 55a and 55b a roller as at 56a and 56b is rotatably mounted.

During operation when rotation of the weight holder 51 by the shaft 6 occurs the L-shaped weight members are caused to pivot outwardly by action of centrifigal force. When this occurs the rollers 56a and 56b will be moved into engagement with a spindle assembly generally designated 58 disposed in the longitudinal line of the mechanical governor and inboard bearing 42 and slideably mounted in an outboard bearing 59.

Spindle assembly 58 includes, the spindle holder 60 which is rotatably disposed in the outboard bearing 59 and a spindle 61 which is slideably disposed in the spindle holder 60.

A follower member and spring stop means 62 is connected to the end of the spindle 61 adjacent the rollers 56a and 56b and at the end remote therefrom a spindle guide 63 is rotatably connected as by a ball bearing means 64 to the spindle 61.

The spindle guide 63 is disposed in a spindle guide bore 65 in the spindle guide holder 66 threadably connected as by threaded means 67 in an opening 68 provided in the end cover 35.

A key member 69 prevents the spindle guide 63 from rotating and O ring seals 70 are provided for preventing leakage of lubricating fluid delivered to the outboard end of the spindle assembly 58 and the outboard bearing 59 by the lubrication system hereinafter more fully described.

A spring 71 disposed about the spindle holder 60 abuts the follower and spring stop means 62 at one end, and at the other end engages an adjustable stop nut 72.

The adjustable stop nut 72 is used to set the tension of the spring 71 which in turn acts to regulate the speed at which the driving shaft 5 of the turbine will operate.

During operation as the rollers 56a and 56b are progressively moved into engagement with the follower and spring stop means 62 due to an increase in the speed of driven shaft 6, they act to slide the spindle 61 towards the outboard end of the mechanical governor 2 and to compress spring member 71 with increasing speed. This will cause the outer most end of the spindle guide 63 to progressively engage the roller member 21 on the governor lever 13 and thus cause the governor lever to move the speed control valve 8 of the turbine 1 towards the closed position by means of the linkages connected thereto as has been described. The spring member 71 acts to move the spindle 61 or return the same to the position shown in FIG. 6 when the speed of driven shaft 6 is decreased at which time steam inlet control valve 8 moves to the open position.

It is thought clear to those skilled in the art from the above description that the governor assembly can be made responsive to any given set of conditions within the parameters of the size of the mechanical governor by varying the spring characteristics, the setting of the spring and/or by providing weight members of different weight. Thus the integral mechanical governor in accordance with the present invention has a universal design adapted not only for the steam turbines in which it is illustrated in the present application but for all types and kinds of rotary devices requiring such speed control means. Further it is adapted for independent manufacture and can be easily connected into operative engagement with the drive shaft of the prime mover or other rotary devices to which it is connected.

It will be further noted that because of the wide variation to which the integral mechanical governor can be adjusted that the weight members 52a and 52b do not have an excessively large arc of movement. This is desirable because of the need to maintain a sufficient depth of lubricant fluid in the sump 32 so that the lubrication pumping device of the lubrication system for the integral mechanical governor, now to be described, will operate properly.

LUBRICATION SYSTEM

Self lubrication of the integral mechanical governor 2 is achieved by a slinger or slinging ring 75 which is gravity mounted on the outer periphery of the weight holder 51 and a plurality of transport means for delivery the lubricating fluid both to the inboard and outboard ends of the governor 2.

Slinger or oil ring 75 is a thin walled relatively narrow annular cylindrical element having a diameter substantially greater than that of the weight holder 51. In assembled position it lies in a groove 76 which is formed on the outer periphery of the weight holder 51 and is so sized that it lies in the sump 33 formed in the housing 31.

Thus, when the weight holder 51 is rotated it will cause the slinger or oil ring 75 to also rotate and the force of rotation will pick up and thus pump the required quantities of lubricating fluid from the sump 33 to the upper section and side of the inner wall of the housing 31.

FIGS. 6, 7, 8 and 9 show that when lubricating fluid is thrown or cast towards the upper section of the housing 31 that a portion thereof will run down along the inner side of the end wall 34 on the inboard side of the housing 31 and collect in a pocket or cup 77 formed in the end wall 34. In assembled position lubricant will then pass from the pocket 77 through cross-passage 78 to a vertical passage 79 in communication with inboard bearing lubrication chamber 80 which communicates both with the inboard bearing 42 and the driven shaft 6.

The seal means 44 provided about the shaft 6 as above described contains the mechanical governor lubricant fluid and prevents the same from escaping to the lubrication system of the turbine or other rotary device with which the mechanical governor is associated.

Lubricating fluid which passes from the inboard lubrication chamber 80 through the inboard bearing 42 is returned by gravity by flowing from the opposite side of the inboard bearing 42 down the sloped wall 81 of end wall 34 to the lubrication fluid sump 33.

A further portion of the lubricating fluid will collect on a transfer member generally designated 83 which is connected to the cover member 40 substantially in the center and along the longitudinal line of the mechanical governor 2. It has laterally extending flanges 84a and 84b on opposite sides of the center line which acts on the respective upper sides thereof as collecting members for lubricant fluid thrown against the upper wall of the housing 31.

Flanges 76a and 76b are sloped towards the outboard end of the mechanical governor so that they also act as transport guides for the collected lubricating fluid. Removably connected filter elements 85a and 85b made of magnetic material are connected adjacent the ends of the flanges 85a and 85b respectively closest to the outboard end of the mechanical governor to collect metal particles from the lubricant fluid.

The transport member 83 and the filter elements 85a and 85b are easily removable for cleaning or replacement purposes.

Figure 9:
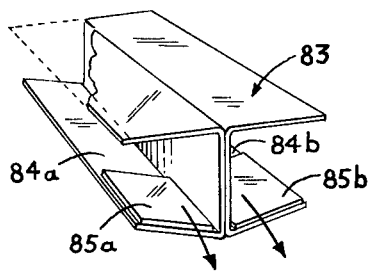
FIG. 9 is a perspective view partly broken away of the transfer member.
Figure 8:
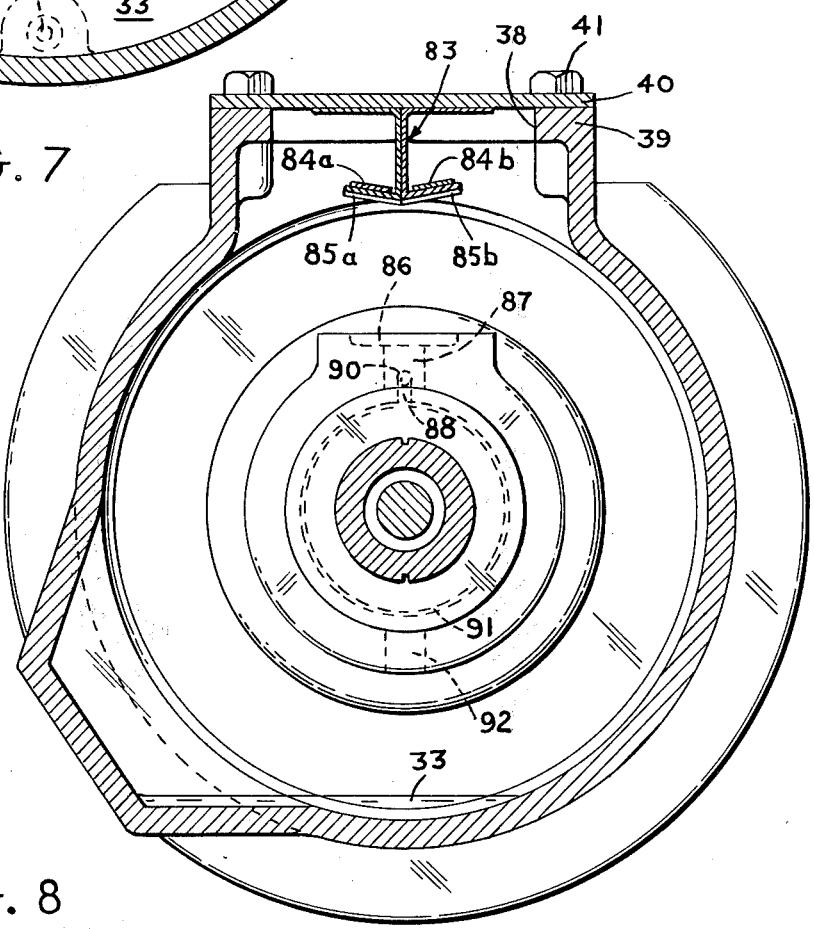
FIG. 8 is a cross section taken on line 8—8 of FIG. 6 showing the transfer member for passing lubricant to the governor assembly and outboard bearing means.

FIGS. 6, 8 and 9 show that the flanges 84a and 84b are sized so that the end furthest from the inboard end of the mechanical governor will lie over a collecting basin 86 which serves to distribute the lubricating fluid to the outboard bearing for the spindle assembly and for the connecting bearing between the spindle and spindle guide.

Thus the collecting basin 86 includes a drain passage 87 which communicates through connecting passage 88 with an outboard lubrication chamber 89. Fluid will flow by gravity from the collecting basin 85 through the drain passage 87 and passage 88 to the outboard lubricating chamber 89 which feeds both the outboard bearing 59 and the connecting bearing 64 as is shown in FIG. 6 of the drawing. Further a connecting passage 90 communicates between the drain passage 87 and an annular space 91 about the spindle guide 63 so that the spindle guide 63 will be well lubricated during operation of the mechanical governor 2.

Fluid delivered to the outboard lubricating chamber 88 and the annular space 90 about the spindle guide 63 is returned by gravity or through return passage 92 to the lubricating fluid sump 33.

OPERATION

The simplicity of the disclosed subject matter will be apparent when it is noted that the integral mechanical governor in accordance with the present invention is adjusted and precisely set at the factory to provide the desired conditions of operation.

Thus when the mechanical governor is to be placed into operation it is merely set into the governor opening provided in the flange 4 and bolted to the flange 4 by any suitable means such as the threaded members 3. When the mechanical governor is in assembled position it will be coupled to the shaft 5 by means of any suitable type of flexible coupling 7 as is well known in the art. Flexible couplings of the type which are utilized for this purpose are well known and purchaseable on the open market.

After the mechanical governor is in assembled position, the cover member 40 is removed by unloosening the threaded members 41 and the mechanical governor is filled with lubricating fluid to the desired level as indicated by the level line in FIG. 6. Then the cover member 40 is replaced.

Under suitable circumstances it is possible to use lubricating fluid from the lubrication system of the turbine where the oil level in the governor is the same as that being maintained in the turbine by means of a bypass oil connection 93 as is shown in phantomized form in FIG. 6 of the drawing.

This bypass oil connection will also permit one oil fill through the mechanical governor cover for both the turbine and the mechanical governor and can also be used as a common oil drain.

When the mechanical governor is in assembled position then the various linkages including the governor lever, the adjustable linkage between the governor lever and the valve stem and the speed adjustment mechanism, all as above described can be assembled to the turbine and the mechanical governor all as shown and above described with reference to FIGS. 1 and 6 of the drawings.

When the turine is placed into operation since the drive shaft 5 is coupled to the driven shaft 6 by means of the flexible coupling 7, the governor assembly will operate automatically so as to move the spindle and spindle guide towards and away from the roller element 21 of the governor lever 13 and thus move the governor lever 13 back and forth in accordance with the speed of rotation of the drive shaft 5.

The precise speed adjustment can be established by adjusting the adjustment wheel or knob 16 until the precise governing or operating speed desired is obtained.

During the operation the slinging ring 75 will sling lubricant fluid against the top and side of the housing 31 and the same will be distributed to the inboard and outboard bearing and returned to the lubricating fluid sump all as above described.

Thus there has been described an integral mechanical governor which has its driven shaft and governor assembly supported by its own bearings and wherein the governor assembly includes a self operated complete lubrication system having a reservoir, pump mean, filter means and a cooler.

Such integral mechanical governors can be built and assembled in large quantities to effect substantial cost savings. It can be factory adjusted and it can be applied to a variety of turbines and other rotary devices operating at different speed and service condition.

It will be understood that the invention is not to be limited to the specific construction or arrangement of parts shown but that they may be widely modified within the invention defined by the claims.

What is claimed is:

1. An integral mechanical governor for use with a prime mover having a rotatable shaft thereon;
   a. a housing forming a governor chamber and a lubricating fluid sump and having at least one open end, and closure means detachably connected to the open end thereof,
   b. means on the inboard end of the housing remote from the open end for connecting the mechanical governor in assembled position on the prime mover,
   c. bearing means in the end wall of the housing on the inboard side thereof,
   d. a driven shaft rotatably mounted in said bearing means and extending in the axial line of the housing from the interior of the governor chamber in said housing to the exterior of the housing to permit the driven shaft to be coupled to the shaft of the prime mover,
   e. governor weight holder means fixedly connected to the end of the driven shaft in the governor chamber and rotatable therewith, and weight means pivotally connected to the governor weight holder,
   f. outboard bearing means connected in said end closure in the axial line of said inboard bearing means,
   g. a governor assembly mounted in said housing and having means thereon slideable in said outboard bearing responsive to the movement of the weight means during rotation of the driven shaft, and
   h. lubrication means in said housing including, an oil ring rotatably connected to the governor assembly and disposed relative said lubrication sump whereby on rotation of said driven shaft lubricant will be thrown and distributed to the upper portion of said governor assembly chamber, and
   i. means in said housing for distributing lubricant from said lubricating fluid sump to the inboard bearing, the outboard bearing and said governor assembly,
   j. said means for distributing lubricant to the inboard bearing includes,
      1. the inboard end wall having a collecting chamber formed thereon,
      2. said inboard end wall having an inboard bearing lubrication chamber formed therein in communication with the inboard bearing,
      3. passage means connecting the collecting chamber to the inboard bearing lubrication chamber, and
      4. means for returning lubricant from said inboard bearing lubricating chamber to said lubricating fluid sump.

2. An integral mechanical governor for use with a prime mover having a rotatable shaft thereon;

a. a housing forming a governor chamber and a lubricating fluid sump and having at least one open end, and closure means detachably connected to the open end thereof, b. means on the inboard end of the housing remote from the open end for connecting the mechanical governor in assembled position on the prime mover, c. bearing means in the end wall of the housing on the inboard side thereof, d. a driven shaft rotatably mounted in said bearing means and extending in the axial line of the housing from the interior of the governor chamber in said housing to the exterior of the housing to permit the driven shaft to be coupled to the shaft of the prime mover, e. governor weight holder means fixedly connected to the end of the driven shaft in the governor chamber and rotable therewith, and weight means pivotally connected to the governor weight holder, f. outboard bearing means connected in said end closure in the axial line of said inboard bearing means, g. a governor assembly mounted in said housing and having means thereon slideable in said outboard bearing responsive to the movement of the weight means during rotation of the driven shaft, and h. lubrication means in said housing including, an oil ring rotatably connected to the governor assembly and disposed relative said lubrication sump whereby on rotation of said driven shaft lubricant will be thrown and distributed to the upper portion of said governor assembly chamber, and i. means in said housing for distributing lubricant from said lubricating fluid sump to the inboard bearing, the outboard bearing and said governor assembly, j. said means for distributing lubricant to said outboard bearing includes,
  1. a removably connected collecting and transport bracket in said housing at the upper end theeof for collecting and directing lubricant fluid towards the outboard end of said mechanical governor,
  2. said outboard end wall having an inboard bearing lubrication basin formed thereon.
  3. said outboard end wall having an outboard bearing lubrication chamber formed therein in communication with said outboard bearing,
  4. said outboard end wall having a passage means providing communication between said collecting basin and said outboard lubrication chamber, and
  5. means for returning lubricant from said outboard bearing lubrication chamber to said lubricating fluid sump.

3. In an integral mechanical governor as claimed in claim 2 including, a filter means on said collecting and transport bracket.

4. In an integral mechanical governor as claimed in claim 3 wherein the filter means includes, a material having magnetic properties.

5. An integral mechanical governor for use with a prime mover having a rotatable shaft thereon;

a. a housing forming a governor chamber and a lubricating fluid sump and having at least one open end, and closure means detachably connected to the open end thereof, b. means on the inboard end of the housing remote from the open end for connecting the mechanical governor in assembled position on the prime mover, c. bearing means in the end wall of the housing on the inboard side thereof, d. a driven shaft rotatably mounted in said bearing means and extending in the axial line of the housing from the interior of the governor chamber in said housing to the exterior of the housing to permit the driven shaft to be coupled to the shaft of the prime mover, e. governor weight holder means fixedly connected to the end of the driven shaft in the governor chamber and rotatable therewith, and weight means pivotally connected to the governor weight holder, f. outboard bearing means connected in said end closure in the axial line of said inboard bearing means, g. a governor assembly mounted in said housing and having means thereon slideable in said outboard bearing responsive to the movement of the weight means during rotation of the driven shaft, and h. lubrication means in said housing including, an oil ring rotatably connected to the governor assembly and disposed relative said lubrication sump whereby on rotation of said driven shaft lubricant will be thrown and distributed to the upper portion of said governor assembly chamber, and i. means in said housing for distributing lubricant from said lubricating fluid sump to the inboard bearing, the outboard bearing and said governor assembly.

j. said means for distributing lubricant to the inboard bearing and the outboard bearing includes,
  1. the inboard end wall having a collecting chamchamber formed therein,
  2. said inboard end wall having an inboard bearing lubrication chamber in communication with the inboard bearing,
  3. passage means connecting the collecting chamber to the inboard bearing lubrication chamber, and
  4. means for returning lubricant from said inboard bearing lubricating chamber to the lubricating fluid sump,
  5. a removably connected collecting and transport bracket in said housing at the upper end thereof for collecting and directing lubricant fluid towards the outboard end of said mechanical governor,
  6. said outboard end wall having a collecting basin formed therein,
  7. said outboard end wall having an outboard bearing lubrication chamber in communication with the outboard bearing,
  8. said outboard end wall having a connecting passage for delivering fluid from said collecting basin to said outboard bearing lubrication chamber, and
  9. a second means for returning lubricant from the outboard bearing lubrication chamber to said lubricating fluid sump.

6. In an integral mechanical governor as claimed in claim 5 including, a filter means on said removably connected collecting and transport bracket.

7. In an integral mechanical governor as claimed in claim 6 wherein the filter means includes a material having magnetic properties.

8. In an integral mechanical governor as claimed in claim 4 including means in said housing to dissipate heat from the lubricant fluid.

9. In an integral mechanical governor as claimed in claim 8 wherein the said means to dissipate heat comprises, fins connected to the outer surface of the housing.

10. In an integral mechanical governor as claimed in claim 3 including means on said housing to dissipate heat from the lubricant fluid.

11. In an integral mechanical governor as claimed in claim 10 wherein the means to dissipate heat comprises, fins connected to the outer surface of the housing.

12. In an integral mechanical governor as claimed in claim 7 including, fin means connected on said housing for dissipating heat from the lubricant fluid.

13. In an integral mechanical governor as claimed in claim 5 including means on said housing to dissipate heat from the lubricant fluid.

14. In an integral mechanical governor as claimed in claim 13 wherein the said means to dissipate heat comprises, fins connected to the outer surface of the housing.

* * * * *